United States Patent
Sonobe

(10) Patent No.: US 9,329,944 B2
(45) Date of Patent: May 3, 2016

(54) STORAGE SYSTEM, STORAGE APPARATUS, AND DATA RESTORATION METHOD

(71) Applicant: FUJITSU LIMITED, Kawasaki-shi (JP)

(72) Inventor: Satoshi Sonobe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 13/778,245

(22) Filed: Feb. 27, 2013

(65) Prior Publication Data
US 2013/0254589 A1    Sep. 26, 2013

(30) Foreign Application Priority Data

Mar. 26, 2012  (JP) .................................. 2012-069342

(51) Int. Cl.
 *G06F 11/14* (2006.01)
 *G06F 11/10* (2006.01)
 *G06F 11/30* (2006.01)

(52) U.S. Cl.
 CPC ........ *G06F 11/1469* (2013.01); *G06F 11/1088* (2013.01); *G06F 11/3034* (2013.01); *G06F 11/3055* (2013.01)

(58) Field of Classification Search
 CPC ............ G06F 11/2064; G06F 11/2071; G06F 11/201; G06F 11/2089; G06F 11/2015; G06F 11/2092; G06F 1/188; G06F 3/0674
 USPC .................................................. 714/6.1, 6.3
 See application file for complete search history.

(56) References Cited

U.S. PATENT DOCUMENTS

| | | | | |
|---|---|---|---|---|
| 4,754,397 A | * | 6/1988 | Varaiya | G06F 1/183 360/133 |
| 5,548,711 A | * | 8/1996 | Brant et al. | 714/5.11 |
| 5,655,150 A | | 8/1997 | Matsumoto et al. | |
| 5,848,230 A | | 12/1998 | Walker | |
| 5,987,566 A | * | 11/1999 | Vishlitzky et al. | 711/114 |

(Continued)

FOREIGN PATENT DOCUMENTS

| | | |
|---|---|---|
| JP | 04-312146 | 11/1992 |
| JP | 08-221217 | 8/1996 |

(Continued)

OTHER PUBLICATIONS

Extended European Search Reported dated Jan. 17, 2014 for corresponding European Application No. 13157169.7.

(Continued)

*Primary Examiner* — Loan L. T. Truong
(74) *Attorney, Agent, or Firm* — Fujitsu Patent Center

(57) ABSTRACT

In a storage system a first control device can restore in a restoration destination storage device a second set of data stored in a second storage device on the basis of a first set of data stored in a first storage device. A third storage device stores progress information indicative of the progress of restoration performed by a first control device. A second control device restores a portion of the second set of data which is not yet restored on the basis of the progress information stored in the third storage device at the time of detecting that the first control device has stopped.

4 Claims, 13 Drawing Sheets

(56) References Cited

U.S. PATENT DOCUMENTS

| | | | |
|---|---|---|---|
| 6,009,275 A * | 12/1999 | DeKoning et al. | 710/220 |
| 6,067,635 A * | 5/2000 | DeKoning et al. | 714/6.21 |
| 6,341,317 B1 * | 1/2002 | D'Errico et al. | 710/15 |
| 6,618,821 B1 * | 9/2003 | Duncan | G06F 11/0796 714/14 |
| 6,625,750 B1 * | 9/2003 | Duso et al. | 714/11 |
| 6,629,264 B1 * | 9/2003 | Sicola | G06F 11/2007 714/15 |
| 6,658,540 B1 * | 12/2003 | Sicola | G06F 11/2007 707/999.202 |
| 6,675,258 B1 * | 1/2004 | Bramhall et al. | 711/114 |
| 7,111,189 B1 * | 9/2006 | Sicola | G06F 11/2092 714/15 |
| 7,536,588 B2 * | 5/2009 | Hafner | G06F 11/1088 714/20 |
| 7,644,300 B1 * | 1/2010 | Rao | G06F 11/1435 714/15 |
| 7,975,168 B2 * | 7/2011 | Morita et al. | 714/6.22 |
| 8,762,771 B2 * | 6/2014 | Jess | G06F 11/1088 714/6.22 |
| 2002/0020175 A1 * | 2/2002 | Street | F25B 49/02 62/132 |
| 2002/0124124 A1 | 9/2002 | Matsumoto et al. | |
| 2003/0172191 A1 * | 9/2003 | Williams | G06F 3/0626 709/253 |
| 2004/0078508 A1 * | 4/2004 | Rivard | 711/4 |
| 2004/0148460 A1 * | 7/2004 | Steinmetz | G06F 3/0611 711/114 |
| 2004/0148461 A1 * | 7/2004 | Steinmetz | G06F 3/0607 711/114 |
| 2005/0022064 A1 * | 1/2005 | Steinmetz | G06F 11/0727 714/42 |
| 2006/0212748 A1 * | 9/2006 | Mochizuki et al. | 714/6 |
| 2006/0236161 A1 | 10/2006 | Tanaka et al. | |
| 2008/0052728 A1 * | 2/2008 | Steinmetz | G06F 13/426 719/313 |
| 2008/0209258 A1 * | 8/2008 | Casale | H04L 12/24 714/4.1 |
| 2010/0205482 A1 * | 8/2010 | Kaneko | 714/6 |
| 2011/0167294 A1 * | 7/2011 | Ninose et al. | 714/6.22 |
| 2012/0005348 A1 * | 1/2012 | Chen | G06F 9/5011 709/226 |
| 2012/0102268 A1 * | 4/2012 | Smith et al. | 711/113 |
| 2013/0155600 A1 * | 6/2013 | Ross | H05K 7/1487 361/679.31 |
| 2013/0212429 A1 * | 8/2013 | Nakayama et al. | 714/6.22 |

FOREIGN PATENT DOCUMENTS

| | | |
|---|---|---|
| JP | 10-105346 | 4/1998 |
| JP | 2002-259063 A | 9/2002 |
| JP | 2006-301714 A | 11/2006 |
| WO | WO 03/077128 A1 | 9/2003 |

OTHER PUBLICATIONS

Japanese Office Action mailed Nov. 10, 2015 for corresponding Japanese Patent Application No. 2012-069342, with Partial English Translation, 5 pages.

* cited by examiner

EXAMPLES OF RAID4 (RAID GROUP #1)

NORMAL TIME

RESTORATION TIME

STORAGE SYSTEM, STORAGE APPARATUS, AND DATA RESTORATION METHOD

CROSS-REFERENCE TO RELATED APPLICATION

This application is based upon and claims the benefit of priority of the prior Japanese Patent Application No. 2012-069342, filed on Mar. 26, 2012, the entire contents of which are incorporated herein by reference.

FIELD

The embodiments discussed herein are related to a storage system, a storage apparatus, and a data restoration method.

BACKGROUND

Storage systems for storing and using data are used at present. A storage system includes a plurality of storage devices and a control device which controls access to data stored in the plurality of storage devices. A RAID (Redundant Arrays of Independent Disks) technique may be used in a storage system. With RAID data is divided, is replicated, is distributed, and is stored in a plurality of storage devices. As a result, for example, a load involved in access is distributed among the plurality of storage devices and high speed can be realized. Furthermore, for example, data redundancy is realized by the use of the plurality of storage devices, so high reliability can be realized.

In particular, there are cases where data is divided and is stored in a plurality of storage devices. In such cases, parity data for data restoration may be generated on the basis of plural pieces of split data obtained by dividing a piece of data. The parity data is stored in a storage device different from a storage device in which each piece of split data is stored. As a result, even if a piece of split data is lost because of, for example, a failure in a storage device, the lost piece of split data can be restored on the basis of the other pieces of split data and the parity data stored in normal storage devices.

If a failure occurs in a storage device, a process for restoring in a spare storage device or the like data stored in the storage device in which a failure occurs may be referred to as reconstruction. In reconstruction, for example, parity data and each piece of split data stored in normal storage devices are used for restoring in a spare storage device a piece of split data or parity data stored in a storage device in which a failure occurs.

For example, a technique by which parity data can dynamically be stored at any location in a storage device by generating arrangement information for managing the position of the parity data in the storage device is known. The following proposal is made. Arrangement information for each storage device is stored in advance in it. When a failure occurs in a storage device, parity data stored in the storage device in which a failure occurs is regenerated on the basis of arrangement information stored in the other storage devices, and arrangement information for the regenerated parity data is also regenerated.

Furthermore, the following proposal is made. When a read or write access from an upper computer occurs during data restoration, the data restoration is deferred. At the time when the access terminates, the data restoration is resumed from a target block nearest the current head position.

In addition, the following proposal is made for an array recorder which makes data redundant for recording. When a request to record data is made, the termination of recording is reported to a request source at the time when the writing of the data is completed regardless of whether the writing of redundant data corresponding to the data is completed.

Japanese Laid-open Patent Publication No. 10-105346
Japanese Laid-open Patent Publication No. 08-221217
Japanese Laid-open Patent Publication No. 04-312146

A control device may control the performance of reconstruction. In this case, when the control device stops during the reconstruction because of, for example, a failure, it is impossible to continue the reconstruction.

For example, after maintenance work, such as replacement of the control device, a new control device may be used for performing reconstruction over again. However, reconstruction is stopped during the maintenance work. Furthermore, reconstruction is performed over again. This takes time. As a result, a longer time is required to perform reconstruction. This is inefficient. In addition, as time required to perform reconstruction becomes longer, the possibility that a failure also occurs in another storage device during the reconstruction increases. Accordingly, the risk of being unable to restore data increases.

SUMMARY

According to an embodiment, a storage system includes a plurality of storage devices including a first storage device and a second storage device, a first control device which restores, based on a first set of data stored in the first storage device, a second set of data stored in the second storage device in a restoration destination storage device which is one of the plurality of storage devices, a third storage device which stores progress information indicative of progress of restoration performed by the first control device, and a second control device which restores a portion of the second set of data which is not yet restored on the basis of the progress information stored in the third storage device upon detecting that the first control device has stopped.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
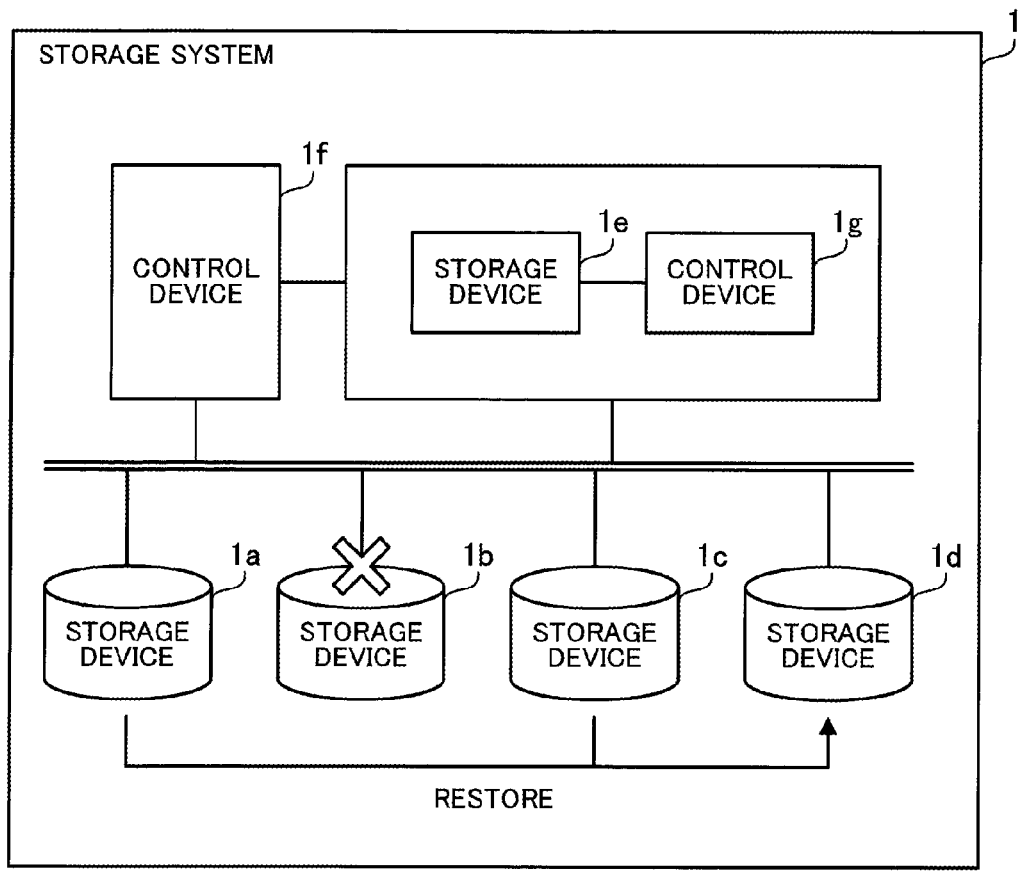
FIG. 1 illustrates a storage system according to a first embodiment.
Figure 1:
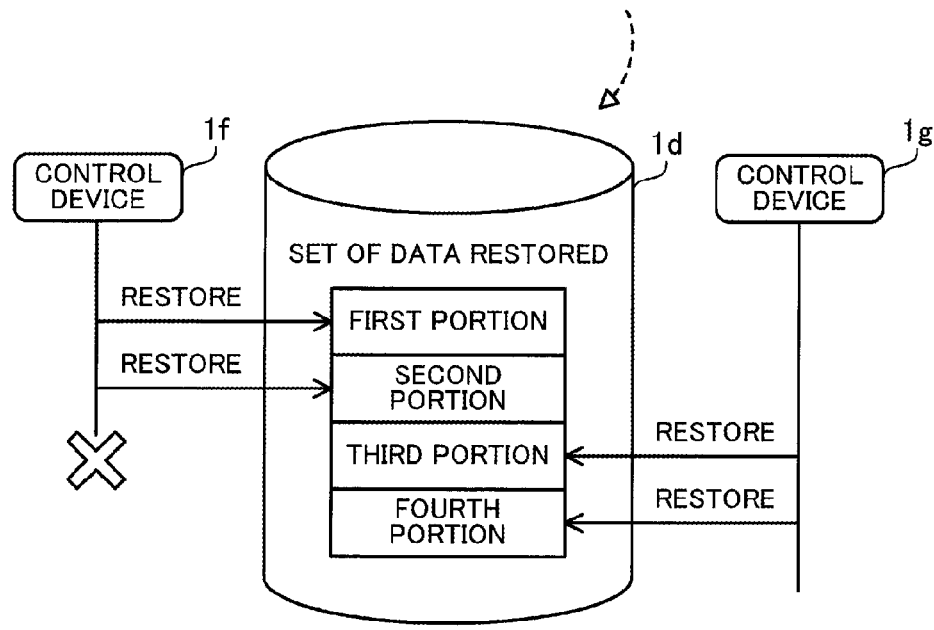

Embodiments will now be described with reference to the accompanying drawings, wherein like reference numerals refer to like elements throughout.

(First Embodiment)

FIG. 1 illustrates a storage system according to a first embodiment. A storage system 1 includes a plurality of storage devices including storage devices 1a, 1b, 1c, and 1d, a storage device 1e other than the plurality of storage devices, and control devices 1f and 1g.

Each of the storage devices 1a, 1b, and 1c stores user data used by a user or the like. The storage device 1d is a spare storage device. When another storage device fails, the storage device 1d is used in place of the failed storage device. For example, magnetic disk units can be used as the storage devices 1a, 1b, 1c, and 1d. Alternatively, storage units of another type, such as SSDs (Solid State Drives) may be used as the storage devices 1a, 1b, 1c, and 1d.

The storage devices 1a, 1b, and 1c can be combined by the RAID technique to treat them as one logical storage device. For example, pieces of split data obtained by dividing one data block are distributed and are stored in the storage devices 1a and 1b. Parity data corresponding to each piece of split data is stored in the storage device 1c (RAID4). The technique of distributing pieces of split data and storing them in a plurality of storage devices may be referred to as striping. A data block is a unit by which an access source apparatus connected to the storage system 1 makes a request to the storage system 1 for access, such as write or read. At read time, the storage system 1 reads out pieces of split data, combines them to generate a data block, and returns the data block to the access source apparatus. Each of the storage devices 1a and 1b may store plural pieces of split data corresponding to a plurality of data blocks. Similarly, the storage device 1c may store plural pieces of parity data. Furthermore, pieces of split data may also be stored in the storage device 1c and plural pieces of parity data may be distributed and be stored in the storage devices 1a, 1b, and 1c (RAID5). RAID5 may be adopted by the use of four or more storage devices. In addition, pieces of split data and two types of parity data may be distributed and be stored in four or more storage devices including the storage devices 1a, 1b, and 1c (RAID6). Hereinafter split data may simply be referred to as data.

It may safely be said that each of the storage devices 1a, 1b, and 1c stores a set of plural pieces of data (including parity data). The same data may be stored in the storage devices 1a and 1b for realizing data redundancy (RAID1).

The storage device 1e stores information which the control device 1f or 1g uses for performing a process. For example, a semiconductor memory, such as a flash memory, can be used as the storage device 1e.

When a failure occurs in one of the plurality of storage devices, the control device 1f can restore in the storage device 1d a set (hereinafter referred to as a second set) of data stored in the storage device in which a failure occurs on the basis of a set (hereinafter referred to as a first set) of data stored in a normal storage device. Data which belongs to the first set corresponds to data which belongs to the second set on a one-to-one basis. The first set or the second set may be a set of all or a part of data stored in each storage device.

For example, it is assumed that data is stored in accordance with the above RAID4 and that a failure occurs in the storage device 1b. The control device 1f can restore in the storage device 1d the second set stored in the storage device 1b by the use of the first set stored in the storage device 1a and a set of parity data stored in the storage device 1c. Furthermore, for example, it is assumed that data is stored in accordance with the above RAID1 and that a failure occurs in the storage device 1b. The control device 1f can restore the second set stored in the storage device 1b by replicating the first set stored in the storage device 1a and storing a replica in the storage device 1d.

The control device 1f restores portions of the second set (which do not overlap with one another) in order in the storage device 1d and stores progress information regarding the restoration in the storage device 1e. With RAID4, RAID5, or RAID6 one logical storage area which extends across a plurality of storage devices may be managed by a unit referred to as a stripe. For example, it is assumed that four stripes which extend across the storage devices 1a, 1b, and 1c are assigned. At this time a first storage area of the storage device 1b is assigned to a first stripe. A second storage area of the storage device 1b is assigned to a second stripe. A third storage area of the storage device 1b is assigned to a third stripe. A fourth storage area of the storage device 1b is assigned to a fourth stripe. In this case, a first portion of the second set is stored in the first storage area. A second portion of the second set is stored in the second storage area. A third portion of the second set is stored in the third storage area. A fourth portion of the second set is stored in the fourth storage area.

The control device 1f can restore the second set according to portions. For example, the control device 1f restores the first portion of the second set on the basis of a determined portion of the first set corresponding to the first portion of the second set. For example, when the control device 1f completes restoration of the first storage area (corresponding to the first portion of the second set) in the storage device 1d, the control device 1f registers in progress information the fact that the first storage area is already restored. The same applies to the second through fourth storage areas. The progress can be managed in this way by a storage area corresponding to each portion of the second set.

The control device 1g can restore the second set in the storage device 1d in the same way that is used by the control device 1f. However, the control devices 1g and 1f exclusively perform a restoration process. When the control device 1g detects that the control device 1f has stopped, the control device 1g takes over restoration of portions of the second set which are not yet restored on the basis of progress information stored in the storage device 1e.

For example, it is assumed that when the control device 1g detects that the control device 1f has stopped, the fact that the first and second portions of the second set are already restored is registered in progress information. Then the control device 1g takes over restoration of the third and fourth portions of the second set which are not yet restored.

With the storage system according to the first embodiment the control device 1f restores in the storage device 1d, which is a restoration destination, the second set stored in the storage device 1b on the basis of the first set stored in the storage device 1a. At this time the control device 1f stores progress information regarding the restoration of the second set in the storage device 1e. When the control device 1g detects that the control device 1f has stopped, the control device 1g takes over restoration of portions of the second set which are not yet restored on the basis of the progress information stored in the storage device 1e.

As a result, data can be restored efficiently. For example, even if the control device 1f stops and a restoration process is stopped, the control device 1g can take over the restoration process. Accordingly, even if a restoration process is stopped because of, for example, a failure in the control device 1f, it is possible to resume the restoration process without waiting for completion of the work of maintaining the control device 1*f*. This makes it possible to reduce time required to perform a restoration process. At this time the control device 1*g* restores only portions which are not yet restored on the basis of progress information registered by the control device 1*f*. If portions which are already restored are restored again, the same process is performed again. This is inefficient. As a result, time required can be reduced compared with a case where a process is performed over again. Data can efficiently be restored in this way.

The function of the control device 1*g* may be implemented in a RAID controller which controls access to a plurality of storage devices treated by the RAID technique as one storage device. The control device 1*f* and the storage device 1*e* may be mounted in a disk shelf which is for housing the plurality of storage devices. A disk shelf may also be referred to as a storage apparatus including a plurality of storage devices. In many cases, power can be supplied separately to the RAID controller and the disk shelf. Accordingly, even when the RAID controller (control device 1*g*) is stopped because of, for example, maintenance work, it is possible to operate the disk shelf (control device 1*f* and the storage device 1*e*).

Furthermore, like the control device 1*f*, the control device 1*g* may register progress information in the storage device 1*e*. When the control device 1*f* goes into a state in which it can resume a restoration process after maintenance work such as replacement, the control device 1*f* may take over a restoration process from the control device 1*g* on the basis of the progress information. The reason for this is that the throughput of the control device 1*f* may be higher than that of the control device 1*g*. By making the control device 1*f* the throughput of which is higher perform a restoration process, time required can be reduced further. As a result, data can be restored more efficiently.

(Second Embodiment)

Figure 2:
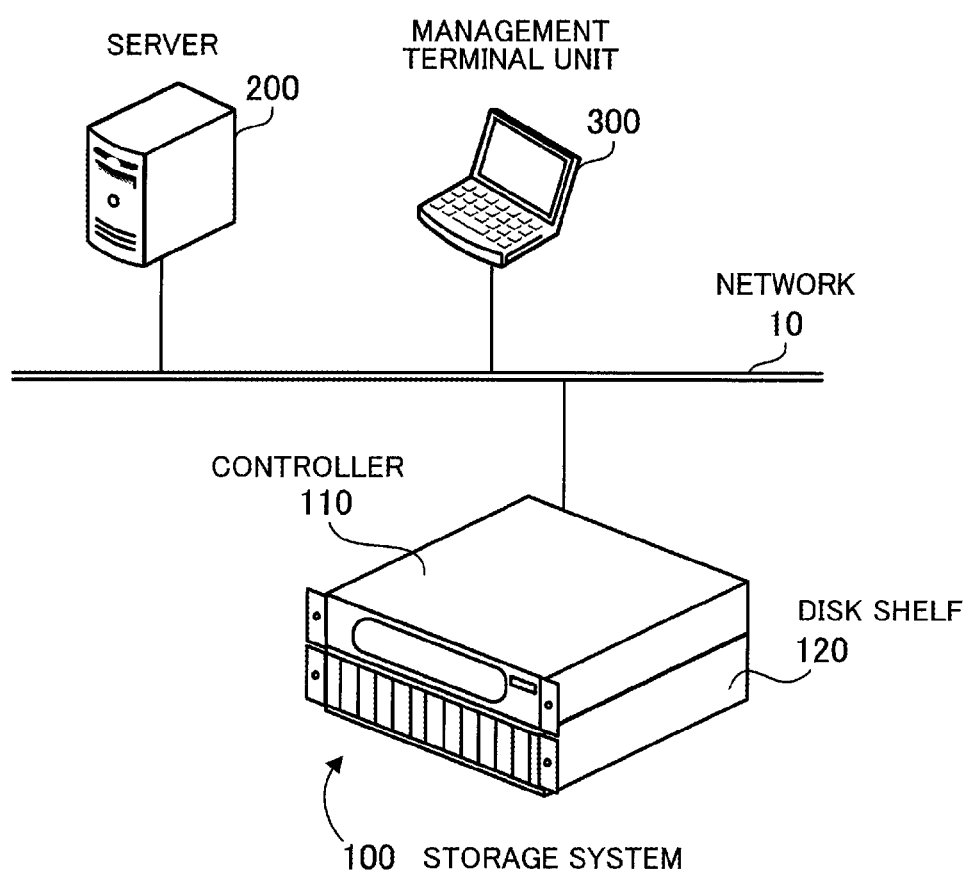
FIG. 2 illustrates a storage system according to a second embodiment.

FIG. 2 illustrates a storage system according to a second embodiment. A storage system 100 includes a controller 110 and a disk shelf 120.

The controller 110 is a RAID controller which uses a plurality of magnetic disk units (hereinafter simply referred to as the disk units) housed in the disk shelf 120 for forming RAID. The controller 110 controls access, such as read or write, to user data in the plurality of disk units.

The disk shelf 120 houses the plurality of disk units. A disk unit may also be referred to as an HDD (Hard Disk Drive).

The storage system 100 is used as a NAS (Network Attached Storage). The storage system 100 is connected to a network 10. The network 10 is an Ethernet (registered trademark) network (such as a LAN (Local Area Network)).

A server 200 is a computer which accesses user data stored in the storage system 100. The server 200 is connected to the network 10. For example, the server 200 can access the storage system 100 by the use of a protocol, such as NFS (Network File System), HTTP (HyperText Transfer Protocol), or CIFS (Common Internet File System). In addition, the server 200 may be able to access the storage system 100 by the use of a protocol for IP-SAN (Internet Protocol-Storage Area Network), such as iSCSI (Internet Small Computer System Interface) or FCIP (Fibre Channel over Internet Protocol).

The storage system 100 and the server 200 may be connected to an FC (Fibre Channel) network, such as a SAN. In this case, the server 200 can access the storage system 100 by the use of an FC protocol.

A management terminal unit 300 is a computer which operates and manages the storage system 100. For example, the controller 110 may perform the function of a Web server and provide a GUI (Graphical User Interface) for operation and management. For example, an administrator can operate the GUI by the use of a Web browser on the management terminal unit 300. For example, the administrator can operate the GUI for monitoring the operational conditions of the storage system 100 or giving the storage system 100 instructions to perform reconstruction. Reconstruction may also be referred to as rebuild.

The storage system 100 may also be referred to as a disk array system (or a disk array apparatus by considering the storage system 100 as one apparatus). The storage system 100 may have the function of a file server. In that case, the storage system 100 may also be referred to as a file server.

Furthermore, the controller 110 may be a controller of a rack mount type or a tower type and the disk shelf 120 may be a disk shelf of a rack mount type or a tower type.

Figure 3:
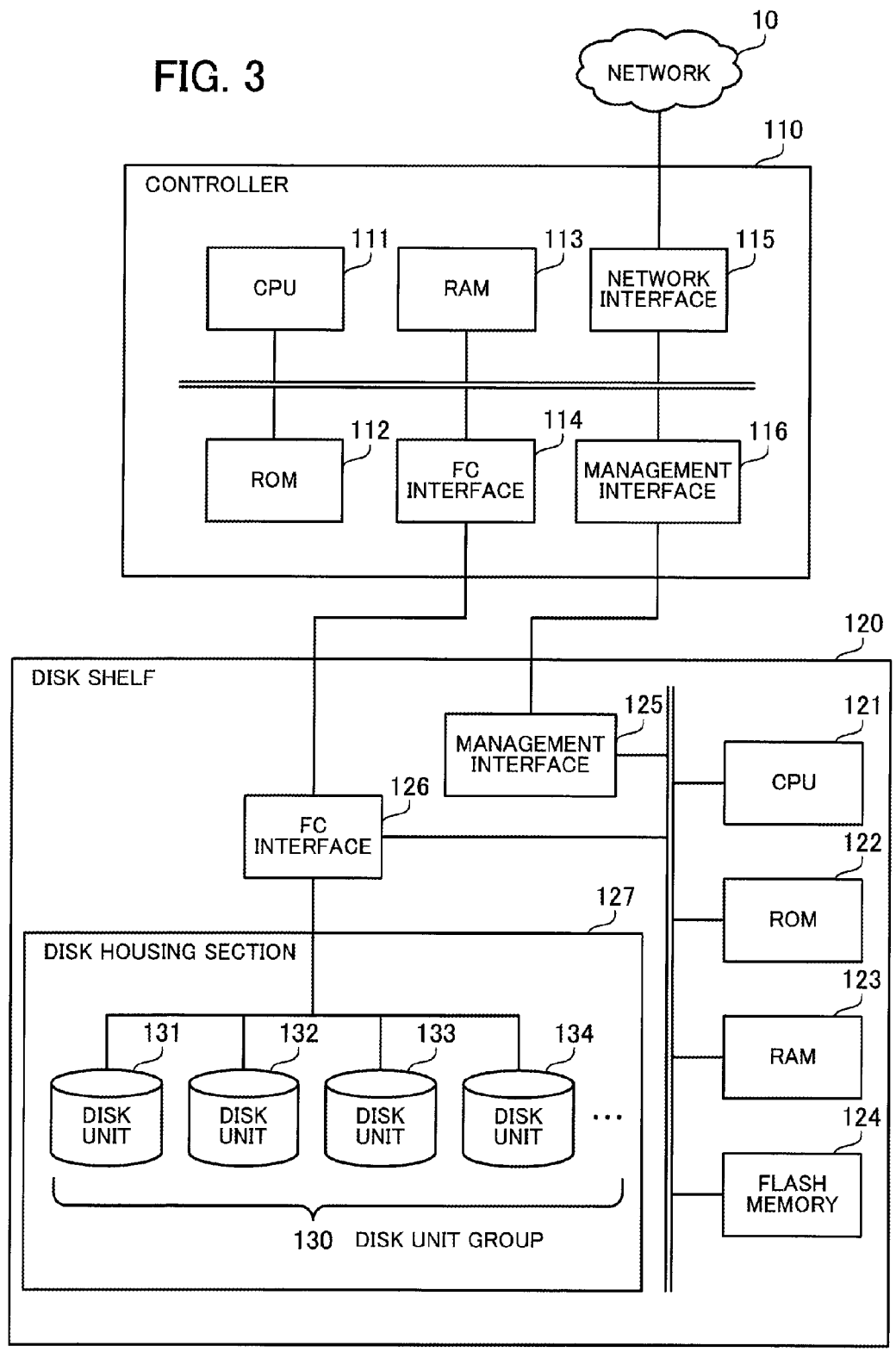
FIG. 3 is an example of hardware of the storage system.

FIG. 3 is an example of hardware of the storage system. The controller 110 includes a CPU (Central Processing Unit) 111, a ROM (Read Only Memory) 112, a RAM (Random Access Memory) 113, an FC interface 114, a network interface 115, and a management interface 116. These components are connected to a bus in the controller 110.

The CPU 111 is a processor which controls information processing by the controller 110. The CPU 111 reads out at least a part of a program stored in the ROM 112 or at least a part of data used for performing a process, expands it in the RAM 113, and executes the program.

The ROM 112 is a nonvolatile memory which stores a determined OS (Operating System) program, a RAID management program, and the like. The ROM 112 may be rewritable.

The RAM 113 is a volatile memory which temporarily stores a program executed by the CPU 111 or data used by the CPU 111 for performing a process.

The FC interface 114 is a communication interface which performs FC communication with the disk shelf 120. In accordance with instructions from the CPU 111 the FC interface 114 performs communication involved in access to data by the server 200.

The network interface 115 is a communication interface which performs communication with the server 200 via the network 10.

The management interface 116 is a communication interface which performs Ethernet communication with the disk shelf 120. In accordance with instructions from the CPU 111 the management interface 116 transmits to or receives from the disk shelf 120 information for management other than communication involved in access to data by the server 200.

The controller 110 may include an operational panel for inputting to the CPU 111, for example, instructions to perform reconstruction.

The disk shelf 120 includes a CPU 121, a ROM 122, a RAM 123, a flash memory 124, a management interface 125, an FC interface 126, and a disk housing section 127. The CPU 121, the ROM 122, the RAM 123, the flash memory 124, the management interface 125, and the FC interface 126 are connected to a bus in the disk shelf 120. The FC interface 126 is connected to the disk housing section 127.

The CPU 121 is a processor which controls information processing by the disk shelf 120. The CPU 121 reads out at least a part of a program stored in the ROM 122 or at least a part of data used for performing a process, expands it in the RAM 123, and executes the program.

The ROM 122 is a nonvolatile memory which stores a program executed by the CPU 121. The ROM 122 may be rewritable.

The RAM 123 is a volatile memory which temporarily stores a program executed by the CPU 121 or data used by the CPU 121 for performing a process.

The flash memory 124 is a nonvolatile memory which stores data used by the CPU 121 at program execution time for performing a process.

The management interface 125 is a communication interface which performs Ethernet communication with the controller 110.

The FC interface 126 is a communication interface which performs FC communication with the controller 110. On the basis of an access request received from the controller 110, the FC interface 126 performs access to a disk unit group 130 housed in the disk housing section 127. The disk housing section 127 returns an access result to the controller 110. In addition, the FC interface 126 can receive instructions from the CPU 121 and perform a process on the disk unit group 130 in accordance with the instructions.

The disk housing section 127 is a housing unit which houses the disk unit group 130. The disk housing section 127 has a plurality of slots which each disk unit included in the disk unit group 130 can be inserted into or extracted from. The disk unit group 130 includes disk units 131, 132, 133, 134, etc. The disk units 131, 132, 133, and 134 belong to one RAID group ("RAID group #1"). Each of the other disk units belongs to a RAID group other than the "RAID group #1".

The disk shelf 120 may be able to house storage devices of another type, such as SSDs, in place of all or a part of the disk units 131, 132, 133, 134, etc. In that case, the controller 110 may form RAID by the use of the storage devices of another type.

Figure 4:
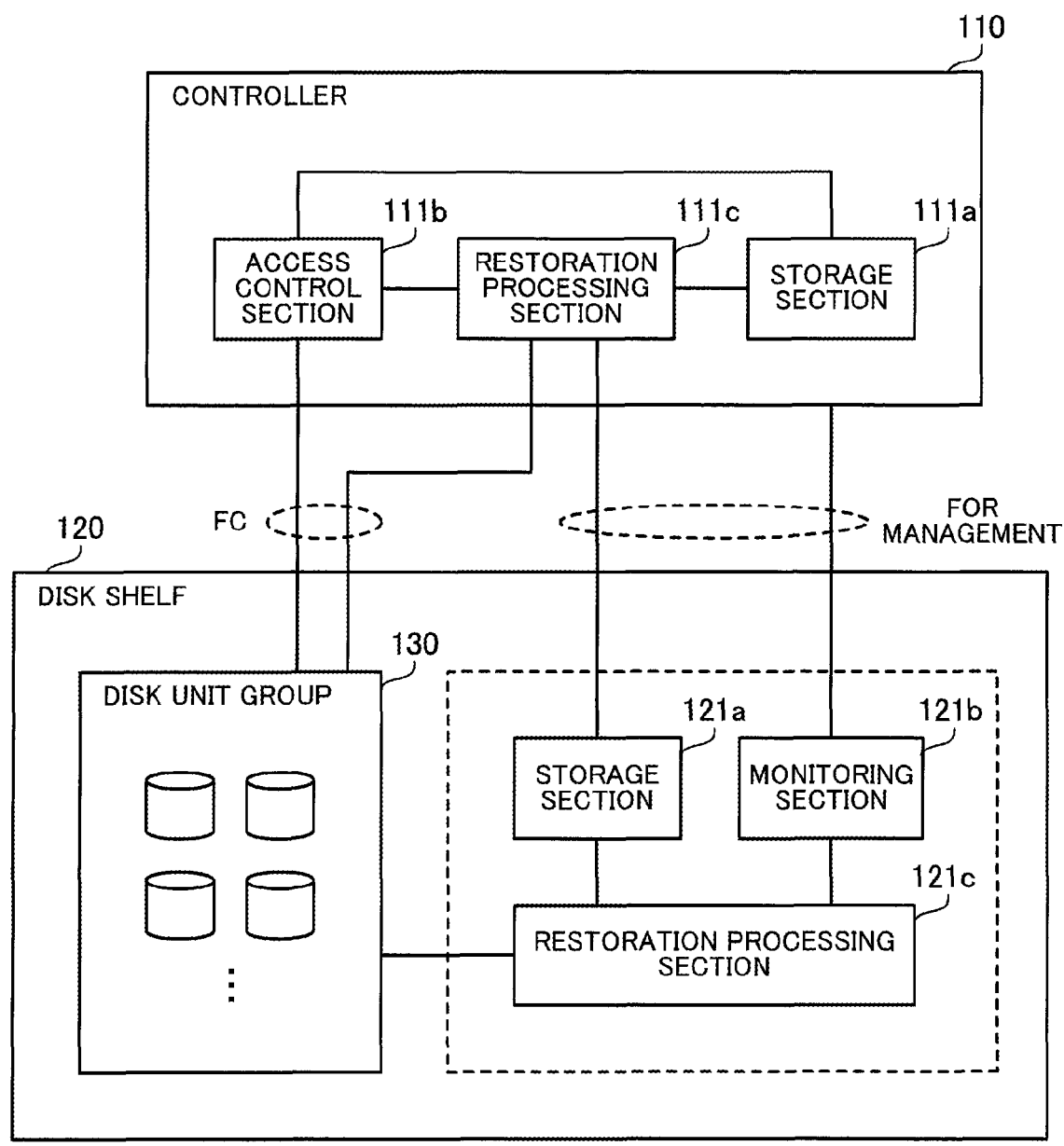
FIG. 4 is an example of software of the storage system.

FIG. 4 is an example of software of the storage system. A part or all of the components (excluding the disk unit group 130) illustrated in FIG. 4 may be modules of programs executed by the controller 110 and the disk shelf 120. Furthermore, a part or all of the components (excluding the disk unit group 130) illustrated in FIG. 4 may be electronic circuits such as FPGAs (Field Programmable Gate Arrays) or ASICs (Application Specific Integrated Circuits).

The controller 110 includes a storage section 111a, an access control section 111b, and a restoration processing section 111c.

The storage section 111a stores various pieces of information used by the access control section 111b or the restoration processing section 111c for performing a process. For example, the storage section 111a stores information for managing the physical arrangement of stripes in RAID4 through RAID6. In addition, the storage section 111a stores information for managing whether or not reconstruction is performed and information for managing the progress of reconstruction. The storage section 111a can be implemented in, for example, the RAM 113.

On the basis of a request from the server 200, the access control section 111b accesses the disk unit group 130. To be concrete, when the access control section 111b receives from the server 200 a request to write user data, the access control section 111b makes the disk unit group 130 write the user data, and transmits the result to the server 200. In addition, when the access control section 111b receives from the server 200 a request to read out user data, the access control section 111b reads out the user data from the disk unit group 130 and transmits it to the server 200. For example, an OS on the server 200 manages user data according to data blocks and makes a write or read request to the controller 110 by the data block. The access control section 111b uses the FC interface 114 for accessing data stored in the disk unit group 130.

Furthermore, a failure may occur in a disk unit included in the disk unit group 130. When the access control section 111b receives instructions to perform reconstruction, the access control section 111b leaves a process to the restoration processing section 111c. The access control section 111b may detect a failure in a disk unit by its function and make the restoration processing section 111c perform reconstruction.

The restoration processing section 111c performs reconstruction. The restoration processing section 111c uses the FC interface 114 to perform communication for controlling the performance of reconstruction. When the restoration processing section 111c begins to perform reconstruction, the restoration processing section 111c stores in the storage section 111a management information indicative of a disk unit on which the reconstruction is being performed. In addition, the restoration processing section 111c stores in the storage section 111a progress information indicative of the progress of the reconstruction. To be concrete, the restoration processing section 111c records in progress information a portion of a failed disk unit for which reconstruction is completed. Furthermore, the restoration processing section 111c also stores the above management information and progress information in a storage section 121a. The restoration processing section 111c uses the management interface 116 for transmitting the management information and the progress information to the disk shelf 120.

The disk shelf 120 includes the storage section 121a, a monitoring section 121b, and a restoration processing section 121c.

The storage section 121a stores various pieces of information (such as the above management information and progress information) used by the restoration processing section 111c or 121c for performing a process. The storage section 121a can be implemented in, for example, the RAM 123 or the flash memory 124.

The monitoring section 121b performs alive monitoring of the controller 110. For example, the monitoring section 121b uses the management interface 125 for transmitting a ping to the controller 110. If there is a ping response in a determined time, then the monitoring section 121b determines that the controller 110 is on. On the other hand, if there is no ping response in the determined time, then the monitoring section 121b determines that the controller 110 is off. The monitoring section 121b performs alive monitoring in this way. Furthermore, for example, just before the controller 110 stops, the monitoring section 121b may receive from the controller 110 notice to the effect that the controller 110 stops, and detect that the controller 110 stops.

When the monitoring section 121b detects that the controller 110 has stopped, the monitoring section 121b leaves a process to the restoration processing section 121c. To be concrete, the CPU 121 reads out in the RAM 123 a program for performing reconstruction stored in the ROM 122, executes the program, and carries out the function of the restoration processing section 121c.

If the controller 110 stops during reconstruction, then the restoration processing section 121c takes over the reconstruction process. The restoration processing section 121c performs reconstruction on the disk units 131, 132, 133, 134, etc. via the FC interface 126. At this time the restoration processing section 121c determines a disk unit on which reconstruction is to be performed on the basis of management information stored in the storage section 121a. Furthermore, the restoration processing section 121c determines a portion of the target disk unit for which the restoration processing section 121c takes over reconstruction on the basis of progress information stored in the storage section 121a.

The restoration processing section 121c performs reconstruction and registers the progress of the reconstruction in progress information stored in the storage section 121a.

It is assumed that RAID4 is adopted in the storage system 100. However, another RAID level, such as RAID5 or RAID6, may be adopted.

Figure 5A:
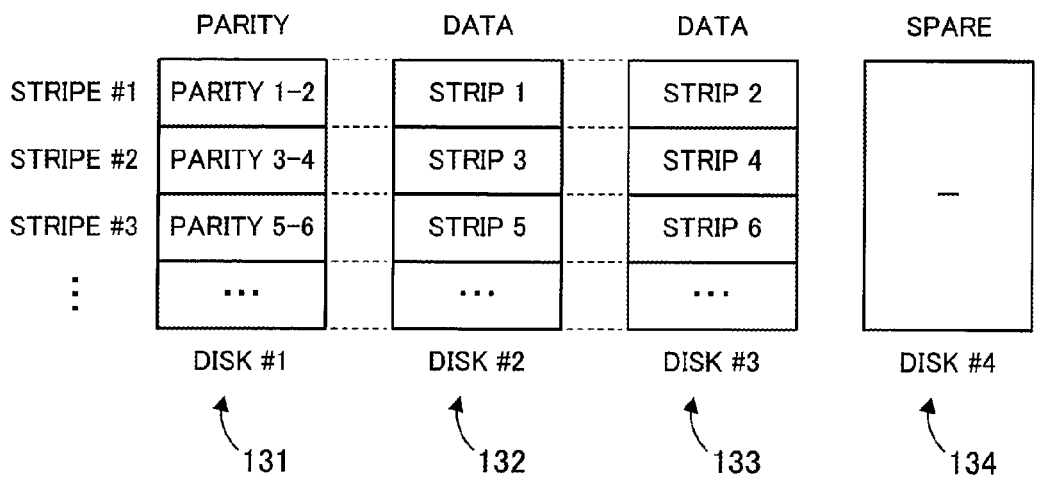
FIGS. 5A and 5B are examples of RAID4.
Figure 5B:
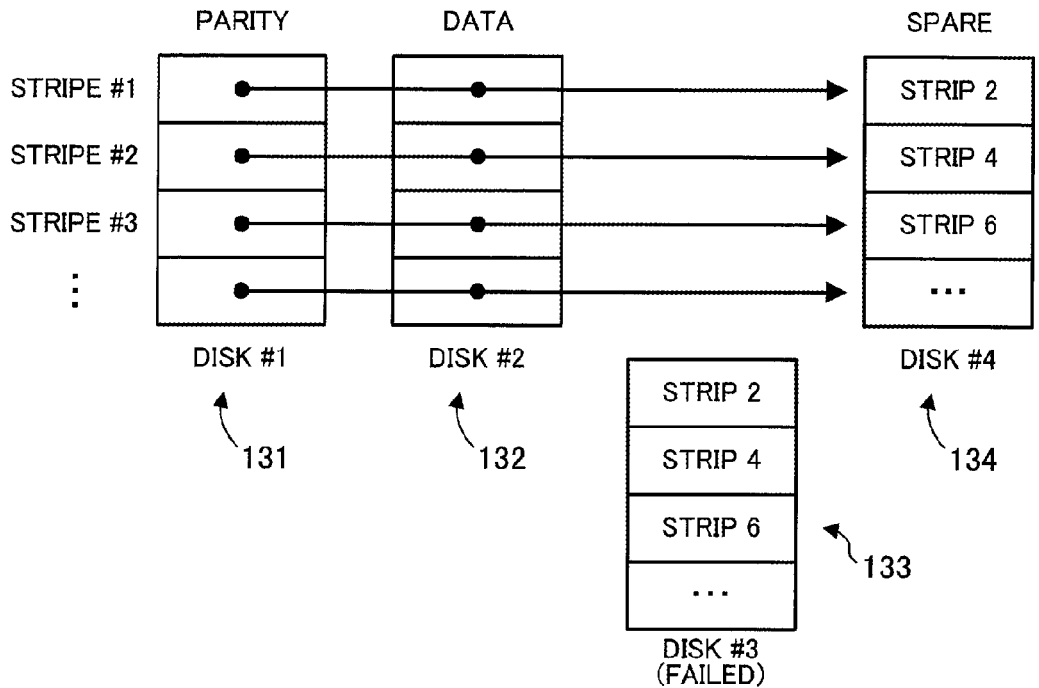

FIGS. 5A and 5B are examples of RAID4. Each of FIGS. 5A and 5B indicates the "RAID group #1" as an example. FIG. 5A indicates the "RAID group #1" at normal time.

The disk unit 131 is a disk unit for storing parity data (and may be referred to as a parity disk). It is assumed that a disk number of the disk unit 131 is "1". (The disk unit 131 is indicated by "disk #1" in FIGS. 5A and 5B. The same applies to FIGS. 7 and 8.)

The disk unit 132 is a disk unit for storing data obtained by dividing a data block (and may be referred to as a data disk). It is assumed that a disk number of the disk unit 132 is "2". In the following description, as in the first embodiment, data obtained by dividing a data block may simply be referred to as data.

The disk unit 133 is a data disk. It is assumed that a disk number of the disk unit 133 is "3".

The disk unit 134 is a spare disk unit (and may be referred to as a spare disk). When one of the disk units 131, 132, and 133 fails, the disk unit 134 is used in place of the failed disk unit. It is assumed that a disk number of the disk unit 134 is "4".

For example, storage areas of the disk units 131, 132, and 133 are divided by the determined size referred to as a strip. To be concrete, the following strips are arranged. Strips having the names "Parity 1-2", "Parity 3-4", "Parity 5-6", etc. are arranged in the disk unit 131. Strips having the names "Strip 1", "Strip 3", "Strip 5", etc. are arranged in the disk unit 132. Strips having the names "Strip 2", "Strip 4", "Strip 6", etc. are arranged in the disk unit 133.

"parity 1-2" indicates a strip which stores parity corresponding to "Strip 1" and "Strip 2". For example, exclusive-OR of "Strip 1" and "Strip 2" is parity corresponding to "Strip 1" and "Strip 2". The size of "Parity 1-2" is equal to the size of "Strip 1" or "Strip 2". Similarly, "parity 3-4" indicates a strip which stores parity corresponding to "Strip 3" and "Strip 4". In addition, "parity 5-6" indicates a strip which stores parity corresponding to "Strip 5" and "Strip 6".

In "RAID group #1" a plurality of stripes which extend across the disk units 131, 132, and 133 are formed by combining each strip. For example, a stripe whose stripe number is "1" (indicated by "Stripe #1" in FIGS. 5A and 5B) is a combination of "Parity 1-2", "Strip 1", and "Strip 2". (The stripe numbers "2" and "3" are also indicated by "Stripe #2" and "Stripe #3", respectively, in FIGS. 5A and 5B.) "Stripe #1" corresponds to one data block. That is to say, this data block is divided and is stored in the two strips in the disk units 132 and 133. A stripe whose stripe number is "2" is a combination of "Parity 3-4", "Strip 3", and "Strip 4". A stripe whose stripe number is "3" is a combination of "Parity 5-6", "Strip 5", and "Strip 6". For example, when a data block is stored in a stripe, the data block is divided and is stored in each strip. It can be said that each of the disk units 131, 132, and 133 stores a set of data corresponding to each strip.

FIG. 5B illustrates an example of a process at restoration (reconstruction) time in the case of the occurrence of a failure in the disk unit 133. In this case, for example, "Strip 2" is restored in the disk unit 134, which is a spare disk, on the basis of "Parity 1-2" in the disk unit 131 and "Strip 1" in the disk unit 132. The same applies to "Strip 4" or "Strip 6".

The parity disk may fail. In that case, reconstruction is performed to find again exclusive-OR of strips arranged in the disk units, regenerate parity, and store it in the spare disk.

Figure 6:
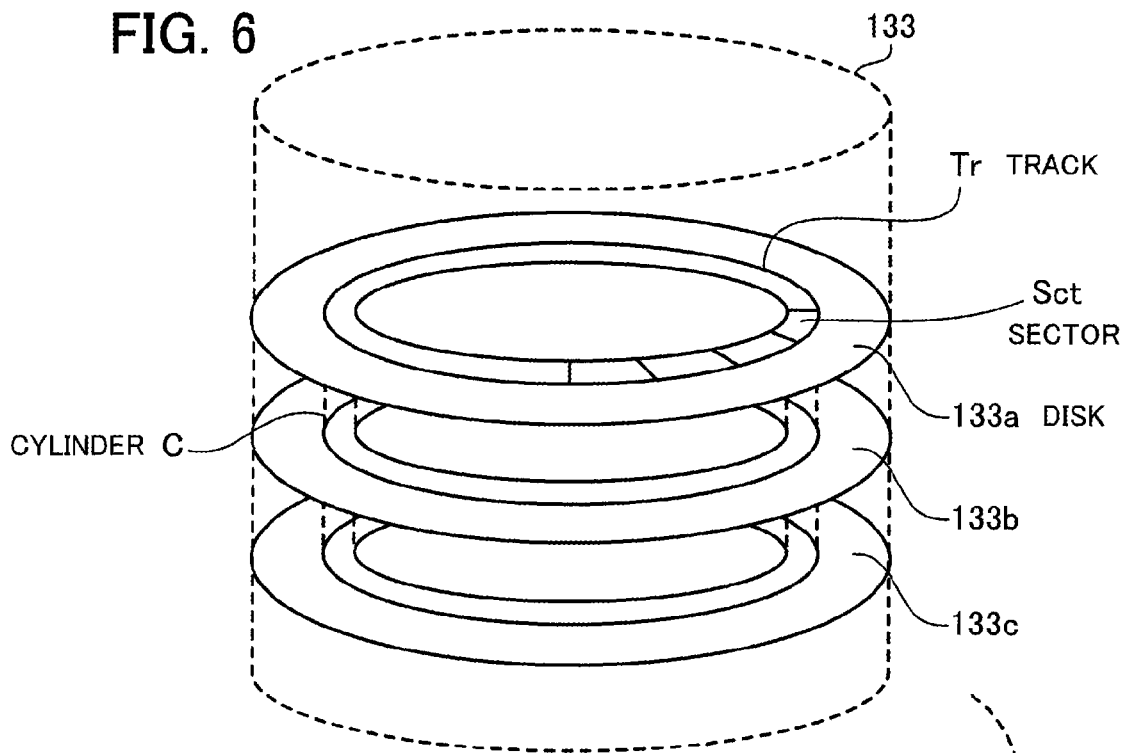
FIG. 6 is an example of a disk unit.
Figure 6:
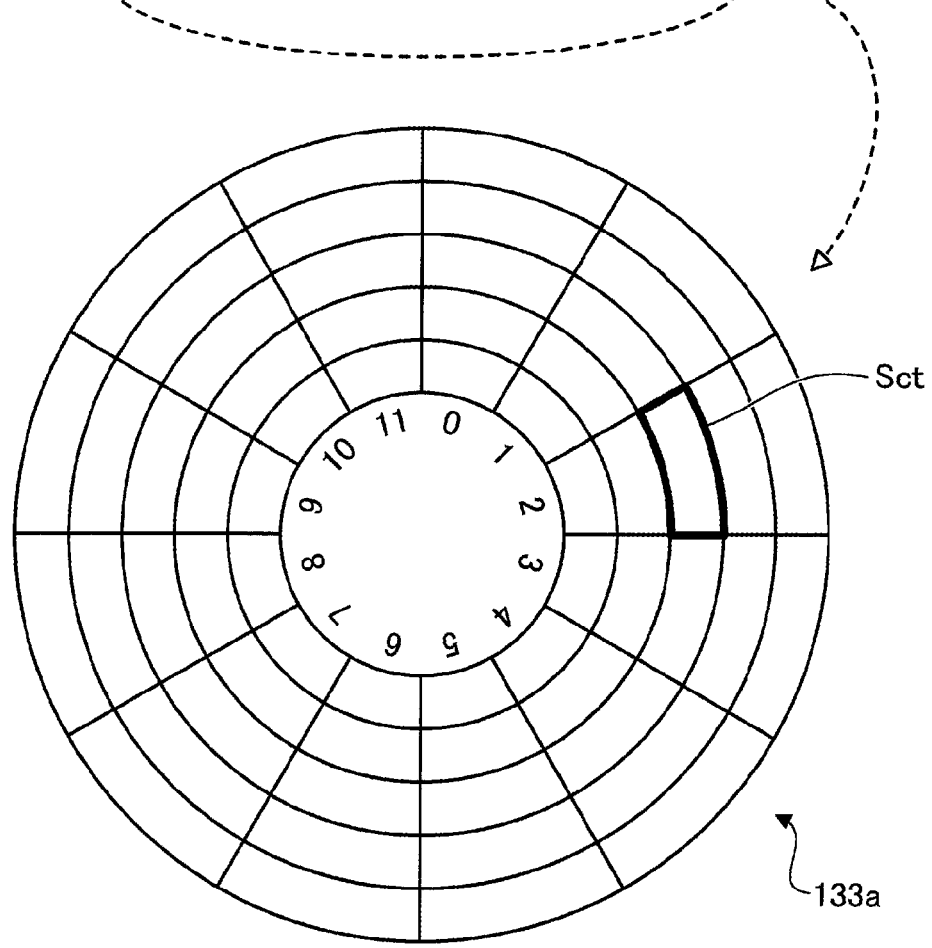

FIG. 6 is an example of the disk unit. The disk unit 133 includes disks 133a, 133b, and 133c. Each of the disks 133a, 133b, and 133c has a plurality of tracks. There is a magnetic head for writing or reading data for each track. For example, the disk 133a has a track Tr as one of the plurality of tracks. Of the disks 133a, 133b, and 133c, a plurality of tracks which are vertically in the same position are managed as a cylinder C. Furthermore, the track Tr is divided into sectors Sct.

For example, it is assumed that k (k is an integer greater than or equal to 1) sectors (0th through (k-1)th sectors, for example) on the disk 133a belong to "Strip 2" and that the next k sectors (kth through (2k-1)th sectors, for example) belong to "Strip 4". The value of k is determined in advance.

For example, the position of a sector Sct can be identified by a combination of information indicative of a cylinder C, information indicative of a magnetic head on a track Tr, and a sector number (sector number "2" in the example of FIG. 6).

A position on the disk 133a can be associated in this way with each strip. Furthermore, information indicative of the correspondence between a stripe and each strip (position in the disk unit 131, 132, or 133) corresponding to the stripe is stored in advance in the storage sections 111a and 121a. Such information may be stored in advance in the disk units 131, 132, and 133 or the like and the CPU 111 or 121 may read out it in the RAM 113 or 123 according to circumstances.

Figure 7:
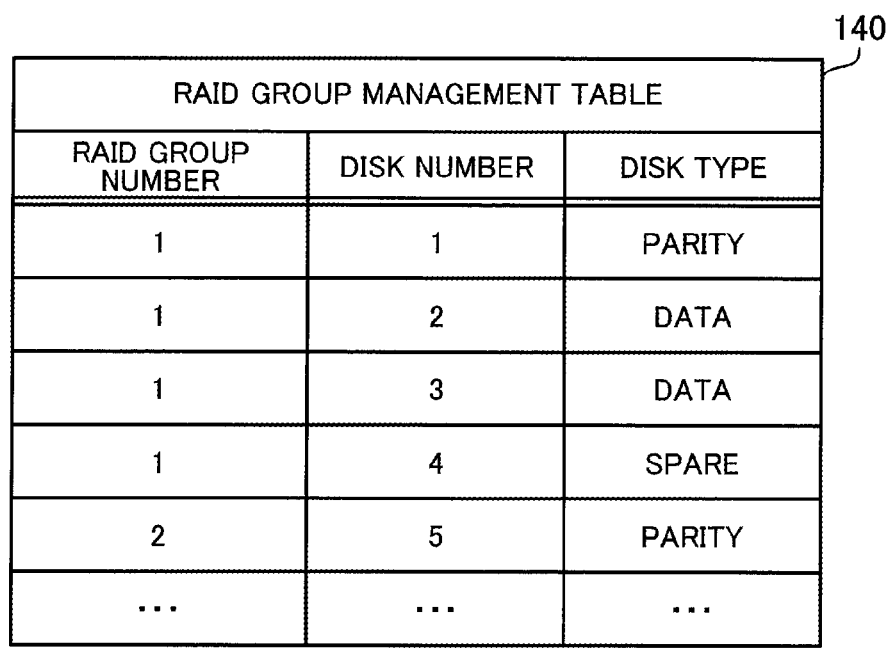
FIG. 7 is an example of a RAID group management table.

FIG. 7 is an example of a RAID group management table. A RAID group management table 140 is stored in the storage sections 111a and 121a. The RAID group management table 140 may be stored in advance in the disk units 131, 132, and 133 or the like and the CPU 111 or 121 may read out it in the RAM 113 or 123 according to circumstances. The RAID group management table 140 includes RAID Group Number, Disk Number, and Disk Type items.

A RAID group number is registered in the RAID Group Number item. A disk number is registered in the Disk Number item. Information for distinguishing among a parity disk, a data disk, and a spare disk is registered in the Disk Type item.

For example, the RAID group number "1", the disk number "1", and the disk type "parity" indicate that the disk unit 131 whose disk number is "1" belongs to "RAID group #1" and that the disk unit 131 is a parity disk.

The disk type "data" indicates a data disk. In addition, the disk type "spare" indicates a spare disk.

The storage system 100 may manage a unit which is formed of a plurality of RAID groups and which is referred to as an aggregate.

Figure 8:
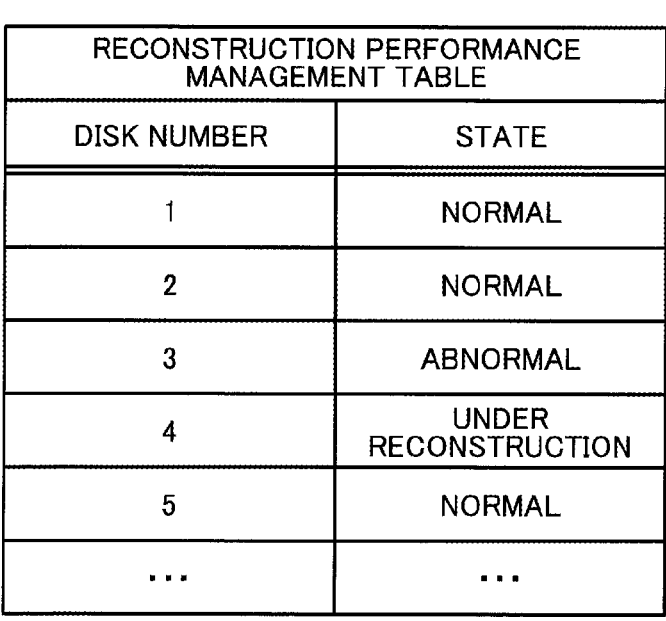
FIG. 8 is an example of a reconstruction performance management table.

FIG. 8 is an example of a reconstruction performance management table. A reconstruction performance management table 150 is management information stored in the storage section 121a. The reconstruction performance management table 150 is used by the restoration processing section 111c for performing a process, so it is also stored in the storage section 111a. The reconstruction performance management table 150 includes Disk Number and State items.

A disk number is registered in the Disk Number item. Information indicative of the state of a disk unit is registered in the State item.

For example, the disk number "1" and the state "normal" indicate that the disk unit 131 whose disk number is "1" is operating normally.

Furthermore, the disk number "3" and the state "abnormal" indicate that an abnormality (failure such as a fault) has occurred in the disk unit 133 whose disk number is "3" and that it is impossible to read out data from or write data to the disk unit 133.

In addition, the disk number "4" and the state "under reconstruction" indicate that data in a disk unit (disk unit 133, in this example) in which an abnormality has occurred is being restored in the disk unit 134 whose disk number is "4".

Figure 9:
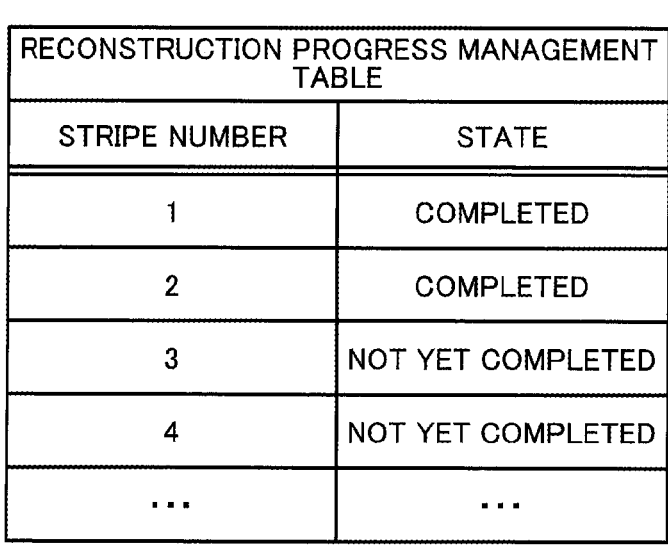
FIG. 9 is an example of a reconstruction progress management table.

FIG. 9 is an example of a reconstruction progress management table. A reconstruction progress management table 160 is progress information stored in the storage section 121a. The reconstruction progress management table 160 is used by the restoration processing section 111c for performing a process, so it is also stored in the storage section 111a. The reconstruction progress management table 160 includes Stripe Number and State items.

A stripe number is registered in the Stripe Number item. Information indicative of a state in which reconstruction is performed is registered in the State item.

For example, the stripe number "1" and the state "completed" indicate that restoration is completed for a strip of a failed disk unit ("strip 2" of the disk unit 133, for example) assigned to the stripe number "1".

Furthermore, for example, the stripe number "3" and the state "not yet completed" indicate that restoration is not yet completed for a strip of a failed disk unit ("strip 6" of the disk unit 133, for example) assigned to the stripe number "3".

In the following description the reconstruction performance management table and the reconstruction progress management table stored in the storage section 111a will not be marked with numerals in order to distinguish them from the tables which have the same names and which are stored in the storage section 121a.

Figure 10:
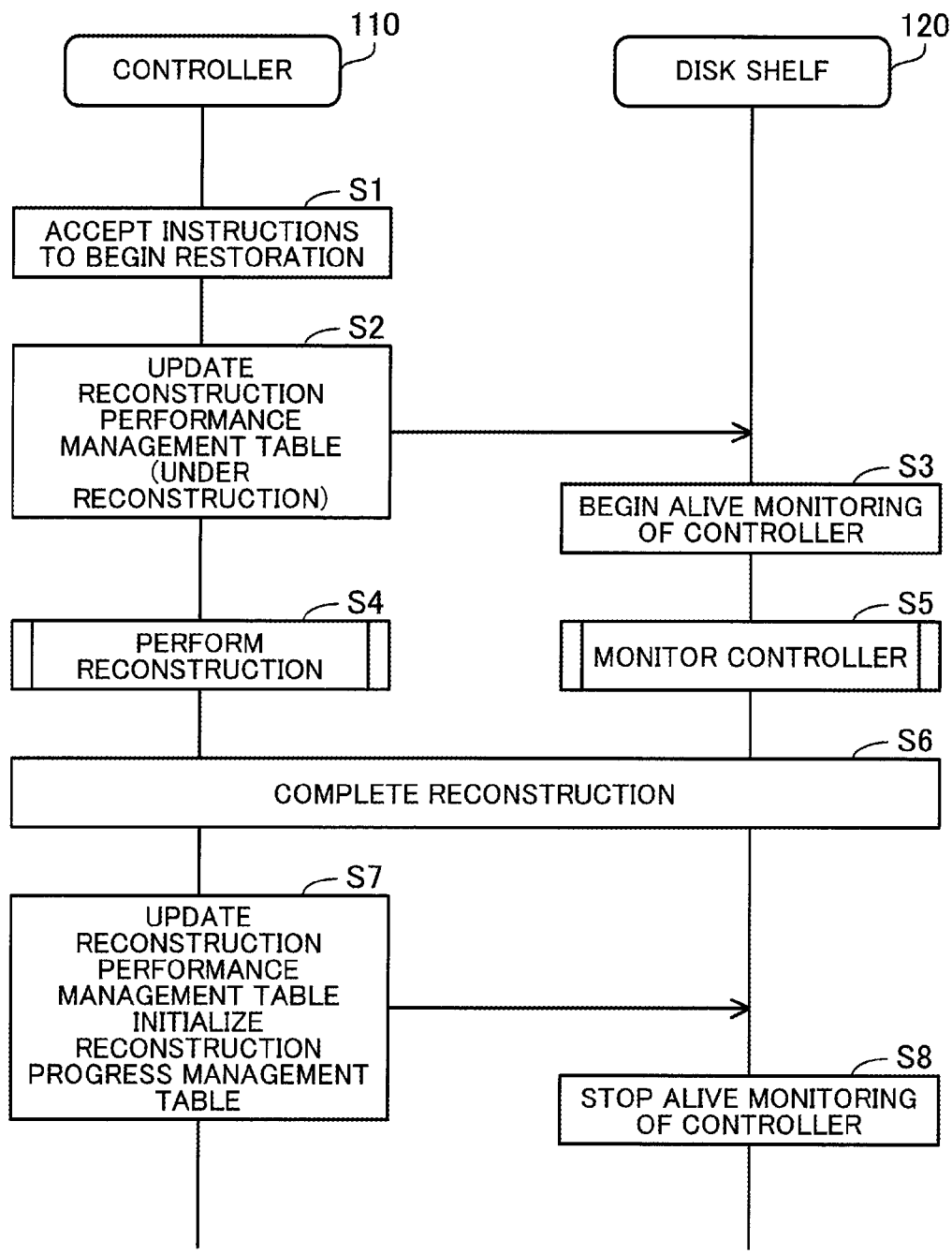
FIG. 10 is a flow chart of an example of control in the storage system.

FIG. 10 is a flow chart of an example of control in the storage system. A process indicated in FIG. 10 will now be described in order of step number.

(Step S1) The access control section 111b accepts instructions to begin restoration. It is assumed that the disk unit 133 fails and that data stored in the disk unit 133 is restored in the disk unit 134 which is a spare disk. The instructions to begin restoration may include information indicative of a restoration source disk unit and a restoration destination disk unit. The access control section 111b leaves a process to the restoration processing section 111c. The access control section 111b may inform the restoration processing section 111c of the information indicative of a restoration source disk unit and a restoration destination disk unit.

(Step S2) The restoration processing section 111c updates the reconstruction performance management table 150 stored in the storage section 121a. To be concrete, the restoration processing section 111c registers "abnormal" in the State item corresponding to the disk unit 133 (disk number "3") and registers "under reconstruction" in the State item corresponding to the disk unit 134 (disk number "4"). The restoration processing section 111c also makes the reconstruction performance management table stored in the storage section 111a reflect the contents of the update. The restoration processing section 111c registers stripe numbers assigned to the failed disk unit 133 in the reconstruction progress management table 160 stored in the storage section 121a. At this point of time "not yet completed" is registered in the State item of the reconstruction progress management table 160 corresponding to each stripe number.

(Step S3) The monitoring section 121b begins alive monitoring of the controller 110. For example, the monitoring section 121b detects that "under reconstruction" is registered in the reconstruction performance management table 150, and begins alive monitoring of the controller 110 with this as a chance. Alternatively, the monitoring section 121b receives from the restoration processing section 111c notice to the effect that the restoration processing section 111c begins to perform reconstruction, and may begin alive monitoring of the controller 110 with this as a chance.

(Step S4) The restoration processing section 111c performs reconstruction. The details will be described later.

(Step S5) While the restoration processing section 111c is performing reconstruction, the monitoring section 121b monitors the controller 110. The details will be described later.

(Step S6) The restoration processing section 111c completes reconstruction. The restoration processing section 121c may complete the reconstruction.

(Step S7) The restoration processing section 111c registers "normal" in the State item of the reconstruction performance management table 150 corresponding to the disk unit 134. In addition, the restoration processing section 111c initializes (clears, for example) contents registered in the reconstruction progress management table 160.

(Step S8) The monitoring section 121b stops alive monitoring of the controller 110. For example, the monitoring section 121b detects that information indicative of "under reconstruction" is deleted from the reconstruction performance management table 150, and stops alive monitoring of the controller 110 with this as a chance. Alternatively, the monitoring section 121b receives from the restoration processing section 111c or 121c notice to the effect that reconstruction is completed, and may stop alive monitoring of the controller 110 with this as a chance.

The controller 110 performs reconstruction in this way. At this time the disk shelf 120 performs alive monitoring of the controller 110.

After step S7, the restoration processing section 111c updates the RAID group management table 140 stored in the storage sections 111a and 121a. To be concrete, the restoration processing section 111c registers "data" in the Disk Type item of the RAID group management table 140 corresponding to the disk number "4" (disk unit 134).

Furthermore, the disk unit 133 is replaced with a new disk unit by, for example, the administrator. After that, the restoration processing section 111c changes "abnormal" registered in the State item of the reconstruction performance management table 150 corresponding to the disk number "3" to "normal". In that case, the new disk unit after the replacement is used as, for example, a new spare disk. Therefore, the restoration processing section 111c registers "spare" in the Disk Type item corresponding to the disk number "3" (new disk unit) of the RAID group management table 140 stored in the storage sections 111a and 121a.

The access control section 111b or the restoration processing section 121c may update the above RAID group management table 140.

A concrete procedure for the above step S4 will now be described.

Figure 11:
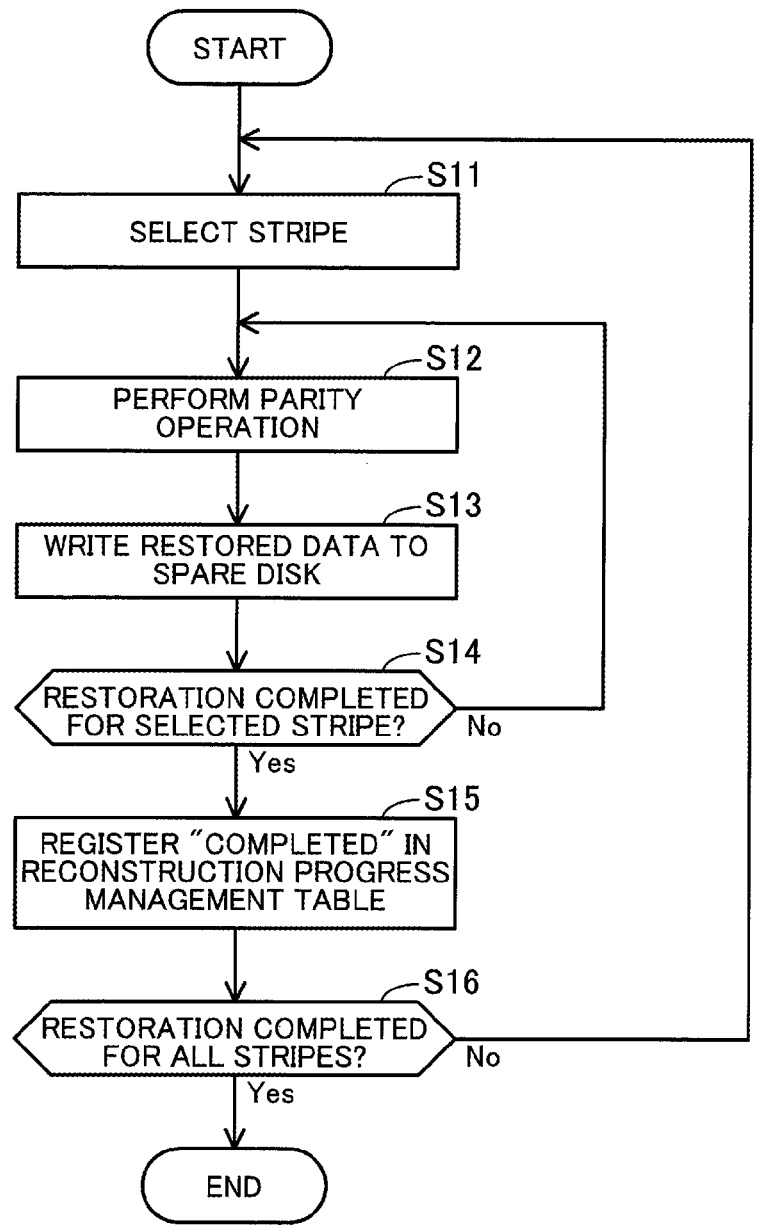
FIG. 11 is a flow chart of an example of reconstruction.

FIG. 11 is a flow chart of an example of reconstruction. A process indicated in FIG. 11 will now be described in order of step number.

(Step S11) The restoration processing section 111c selects a stripe for which restoration is to be performed. To be concrete, the restoration processing section 111c refers to the reconstruction progress management table stored in the storage section 111a, specifies stripe numbers for which restoration is not yet completed, and selects one of the stripe numbers. For example, the restoration processing section 111c may select the stripe numbers in ascending order.

(Step S12) The restoration processing section 111c performs a parity operation on the basis of strips in the disk units 131 and 132 corresponding to the selected stripe number and restores data in the failed disk unit 133. For example, if the restoration processing section 111c selects the stripe number "1", then the restoration processing section 111c restores data in "strip 2" on the basis of "parity 1-2" in the disk unit 131 and "strip 1" in the disk unit 132.

(Step S13) The restoration processing section 111c writes the restored data to the disk unit 134. The restoration processing section 111c may write the restored data to a strip in the disk unit 134 corresponding to a strip in the disk unit 133 corresponding to the selected stripe number.

(Step S14) The restoration processing section 111c determines whether or not restoration to the disk unit 134 is completed for the selected stripe. If restoration to the disk unit 134 is completed for the selected stripe, then the restoration processing section 111c proceeds to step S15. If restoration to the disk unit 134 is not completed for the selected stripe, then the restoration processing section 111c proceeds to step S12.

(Step S15) The restoration processing section 111c registers "completed" for the reconstruction of the selected stripe in the reconstruction progress management table 160 stored in the storage section 121a. For example, if the restoration of "strip 2" to the disk unit 134 is completed for the stripe number "1", then the restoration processing section 111c registers "completed" in the State item corresponding to the stripe number "1". Similarly, the restoration processing section 111c updates the reconstruction progress management table stored in the storage section 111a.

(Step S16) The restoration processing section 111c determines whether or not restoration is completed for all the stripes. If restoration is completed for all the stripes, then the restoration processing section 111c terminates the process. If there is a stripe for which restoration is not completed, then the restoration processing section 111c proceeds to step S11. For example, the restoration processing section 111c refers to the reconstruction progress management table stored in the storage section 111a. If "completed" is registered in the State item corresponding to each stripe number, then the restoration processing section 111c determines that restoration is completed for all the stripes. On the other hand, if "not yet completed" is registered in the State item corresponding to a stripe number, then the restoration processing section 111c determines that there is a stripe for which restoration is not completed.

The restoration processing section 111c restores in this way in the disk unit 134 data in the disk unit 133.

A concrete procedure for step S5 indicated in FIG. 10 will now be described.

Figure 12:
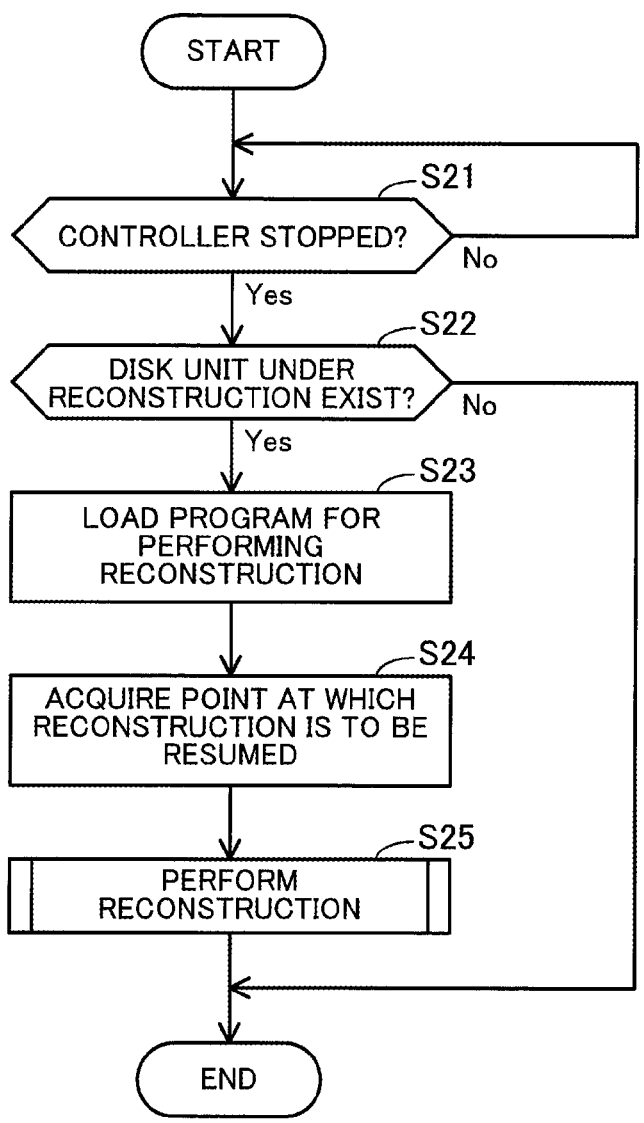
FIG. 12 is a flow chart of an example of monitoring by a disk shelf.

FIG. 12 is a flow chart of an example of monitoring by the disk shelf. A process indicated in FIG. 12 will now be described in order of step number.

(Step S21) The monitoring section 121b performs alive monitoring of the controller 110 and determines whether or not the controller 110 has stopped. If the controller 110 has stopped, then the monitoring section 121b proceeds to step S22. If the controller 110 has not stopped, then the monitoring section 121b continues to perform step S21. As stated above, for example, a ping can be used as a method for alive monitoring.

(Step S22) On the basis of the reconstruction performance management table 150 stored in the storage section 121a, the monitoring section 121b determines whether or not there is a disk unit under reconstruction. If there is a disk unit under reconstruction, then the monitoring section 121b proceeds to step S23. If there is no disk unit under reconstruction, then the monitoring section 121b stops alive monitoring of the controller 110 and terminates the process. For example, if there is a disk unit for which "under reconstruction" is registered in the State item of the reconstruction performance management table 150, then the monitoring section 121b determines that there is a disk unit under reconstruction. On the other hand, if there is no disk unit for which "under reconstruction" is registered in the State item of the reconstruction performance management table 150, then the monitoring section 121b determines that there is no disk unit under reconstruction.

(Step S23) The monitoring section 121b reads out a program for performing reconstruction from the ROM 122 and stores (loads) it in the RAM 123. The CPU 121 executes the program loaded. By doing so, the CPU 121 carries out the function of the restoration processing section 121c.

(Step S24) On the basis of the reconstruction performance management table 150, the restoration processing section 121c specifies the disk unit 134 under reconstruction. On the basis of the reconstruction progress management table 160 stored in the storage section 121a, the restoration processing section 121c acquires a point in the disk unit 134 at which reconstruction is to be resumed. In the reconstruction progress management table 160 described in FIG. 9, for example, "completed" is registered in the State item corresponding to the stripe numbers "1" and "2" and "not yet completed" is registered in the State item corresponding to the stripe numbers "3" and "4". For example, it is assumed that the restoration processing section 121c performs reconstruction in ascending order of stripe number. In that case, the restoration processing section 121c acquires the stripe number "3" as a point at which reconstruction is to be resumed. As a result, the restoration processing section 121c can determine a position in the disk unit 134 at which reconstruction is to be resumed.

(Step S25) the restoration processing section 121c performs reconstruction for a stripe acquired as a point at which reconstruction is to be resumed.

The monitoring section 121b performs alive monitoring of the controller 110 in this way. If the controller 110 stops, the restoration processing section 121c takes over reconstruction which is halfway performed by the restoration processing section 111c on the basis of the reconstruction progress management table 160.

A procedure for reconstruction by the restoration processing section 121c is the same as that for reconstruction by the restoration processing section 111c described in FIG. 11. However, when the restoration processing section 121c performs step S11 at first, the restoration processing section 121c selects a point at which reconstruction is to be resumed which is acquired in step S24. When the restoration processing section 121c performs step S11 from the second time on, the restoration processing section 121c performs step S11 the same as the restoration processing section 111c performs step S11. Furthermore, in step S15 the restoration processing section 121c need only update the reconstruction progress management table 160 stored in the storage section 121a. That is to say, the restoration processing section 121c does not update the reconstruction progress management table stored in the controller 110.

In addition, as stated above, the restoration processing section 121c may complete reconstruction (see the description of step S6 of FIG. 10). In that case, the restoration processing section 121c updates the reconstruction performance management table 150 stored in the storage section 121a and initializes the reconstruction progress management table 160 stored in the storage section 121a, by the same method that is described in step S7 of FIG. 10.

As has been described, even if the controller 110 stops and reconstruction cannot be continued, the disk shelf 120 takes over the reconstruction. By doing so, reconstruction can be performed efficiently.

The number of disk units included in the storage system 100 is increasing year by year. On the other hand, the failure rate of a disk unit has ceased to fall. Some disk units are high in failure rate. As a result, the frequency with which reconstruction is performed has increased. Furthermore, the capacity of a disk unit itself has increased. This makes time required to perform reconstruction longer. As a result, the risk of the occurrence of a failure in the controller 110 in the middle of reconstruction increases. In addition, if reconstruction is prolonged, then the possibility that a failure occurs in the middle of the reconstruction in another disk unit which belongs to the same RAID group increases. If a failure occurs simultaneously in a plurality of disk units, it may be impossible to perform reconstruction. As a result, the risk of making it impossible to restore data increases.

With the storage system 100, on the other hand, reconstruction can be resumed without waiting for the completion of maintenance work of the controller 110 even if it takes a long time. At this time the disk shelf 120 performs a restoration process by the controller 110 only for a portion of the failed disk unit 133 for which restoration is not yet performed on the basis of the reconstruction progress management table 160 stored in the storage section 121a. As a result, time required can be reduced compared with a case where restoration is performed over again. Reconstruction can efficiently be performed in this way.

There are cases where while the restoration processing section 121c is performing reconstruction, the controller 110 is replaced or repaired and a controller after the replacement or the repair (same numeral that is used for the controller 110 is used for this controller) is started. In that case, the controller 110 after the replacement or the repair may take over the reconstruction process from the disk shelf 120. A procedure for a process at the time of starting the controller 110 will be described.

Figure 13:
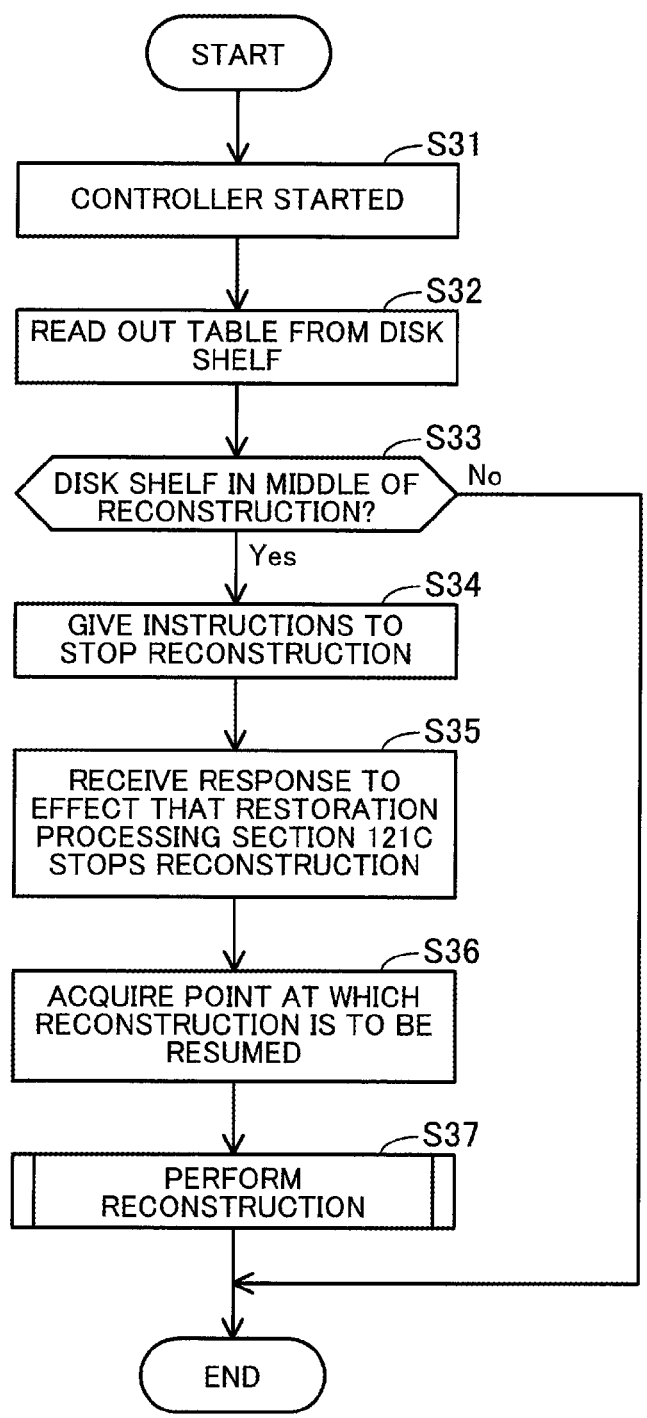
FIG. 13 is a flow chart of an example of a process at the time of starting a controller.

FIG. 13 is a flow chart of an example of a process at the time of starting the controller. A process indicated in FIG. 13 will now be described in order of step number.

(Step S31) The controller 110 after maintenance work is started. The access control section 111b completes preparation for access to the disk unit group 130.

(Step S32) The restoration processing section 111c reads out the reconstruction performance management table 150 stored in the storage section 121a, and stores it in the storage section 111a.

(Step S33) On the basis of the reconstruction performance management table stored in the storage section 111a, the restoration processing section 111c determines whether or not the disk shelf 120 is in the middle of reconstruction. If the disk shelf 120 is in the middle of reconstruction, then the restoration processing section 111c proceeds to step S34. If the disk shelf 120 is not in the middle of reconstruction, then the restoration processing section 111c terminates the process. For example, if there is a disk unit for which "under reconstruction" is registered in the State item of the reconstruction performance management table, then the restoration processing section 111c determines that the disk shelf 120 is in the middle of reconstruction. On the other hand, if there is no disk unit for which "under reconstruction" is registered in the State item of the reconstruction performance management table, then the restoration processing section 111c determines that the disk shelf 120 is not in the middle of reconstruction.

(Step S34) The restoration processing section 111c gives the restoration processing section 121c instructions to stop reconstruction.

(Step S35) The restoration processing section 111c receives from the restoration processing section 121c a response to the effect that the restoration processing section 121c stops reconstruction.

(Step S36) On the basis of the reconstruction progress management table stored in the storage section 111a, the restoration processing section 111c acquires a point at which reconstruction is to be resumed. A concrete method is the same as that described in step S24 of FIG. 12.

(Step S37) The restoration processing section 111c performs reconstruction.

If the disk shelf 120 is in the middle of reconstruction at the time of the controller 110 being started after maintenance work, then the controller 110 takes over the reconstruction in this way. A procedure for step S37 is the same as that described in FIG. 11. However, when the restoration processing section 111c performs step S11 at first, the restoration processing section 111c selects a stripe acquired in step S36 as a point at which reconstruction is to be resumed. When the restoration processing section 111c performs step S11 from the second time on, the restoration processing section 111c performs step S11 exactly as it is described.

Furthermore, the disk shelf 120 performs alive monitoring of the controller 110, so the disk shelf 120 can detect in step S34 or S35 that the controller 110 is started. The disk shelf 120 may spontaneously stop reconstruction which it is performing with the fact that it detects that the controller 110 is started as a chance.

The CPU 111 of the controller 110 controls access and the like, so its performance may be higher than that of the CPU 121 of the disk shelf 120. In this case, it may be possible to complete a reconstruction process in a short period of time by making not CPU 121 but the CPU 111 perform the reconstruction process. Therefore, after the controller 110 is started, the controller 110 takes over reconstruction from the disk shelf 120. By doing so, reconstruction can be performed more efficiently.

In addition, the storage system 100 includes the disk shelf 120 having the function of performing reconstruction in place of the controller 110. In this case, there is no need to use another enclosure in addition to an existing enclosure. This makes it possible to save space. Furthermore, in many cases power can be supplied separately to the storage system 100 and the disk shelf 120. Accordingly, when the supply of power to the controller 110 is stopped because of maintenance work, an environment in which the disk shelf 120 continues reconstruction can be realized at a low cost by utilizing existing equipment.

Furthermore, a plurality of disk shelves 120 may be included. In that case, for example, RAID groups are managed according to disk shelves 120 in the RAID group management table 140 (by associating the RAID groups with identification information for the disk shelves, for example). The restoration processing section 111c stores the reconstruction performance management table 150 and the reconstruction progress management table 160 in a determined storage section included in a disk shelf 120 for which reconstruction is to be performed. By doing so, reconstruction can be taken over in each of the plurality of disk shelves 120. Accordingly, even if the plurality of disk shelves 120 are included, reconstruction can be performed efficiently.

If a failure occurs in one of two disk units used for realizing data redundancy by RAID1, data stored in a normal disk unit may be replicated to a spare disk to perform data restoration.

In that case, data restoration can also be performed efficiently by the same method that is used in the storage system 100. It is possible to manage by the sector, the set of sectors (block), or the like portions of data in a failed disk unit for which restoration is already performed and for which restoration is not yet performed instead of managing by the stripe portions for which restoration is already performed.

According to an embodiment, data restoration can be performed efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
   a plurality of storage devices including a first storage device and a second storage device;
   a first control device which restores, based on a first set of data stored in the first storage device, a second set of data stored in the second storage device in a restoration destination storage device which is one of the plurality of storage devices and registers, in progress information, information indicative of a position in the second storage device corresponding to a portion of the second set of data which is not yet restored;
   a third storage device which stores the progress information indicative of progress of restoration performed by the first control device; and
   a second control device which determines, based on the progress information stored in the third storage device upon detecting that the first control device has stopped, a position in the restoration destination storage device at which restoration is to be started, and restores the portion of the second set of data which is not yet restored based on the progress information, wherein:
   the second control device restores in order the portion of the second set of data which is not yet restored, and updates the progress information stored in the third storage device;
   the first control device stops restoring by the second control device by transmitting an instruction to stop restoration to the second control device and takes over restoration of the portion of the second set of data which is not yet restored based on the progress information from the second control device which is in the middle of restoration at the time of the first control device being started; and
   the second control device and the third storage device are provided in a disk shelf which is able to house the plurality of storage devices and whose power is supplied separately from supply for the first control device.

2. The storage system according to claim 1, wherein:
   the disk shelve is provided in plurality; and
   each of the plurality of disk shelves takes over restoration of storage device groups managed for said each of the plurality of disk shelves.

3. A storage apparatus comprising:
   a plurality of storage sections including a first storage section and a second storage section;
   a third storage section which stores progress information indicative of progress of restoration performed by a control device that restores, based on a first set of data stored in the first storage section, a second set of data stored in the second storage section in a restoration destination storage section which is one of the plurality of storage sections and registers, in the progress information, information indicative of a position in the second storage device corresponding to a portion of the second set of data which is not yet restored; and
   a control section which determines, based on the prowess information stored in the third storage section upon detecting the control device has stopped, and restores the portion of the second set of data which is not yet restored based on the progress information, wherein:
   the control section restores in order the portion of the second set of data which is not yet restored, updates the progress information stored in the third storage device and stops restoration upon receiving an instruction to stop restoration from the control device in the middle of restoration at the time the control device being started; and
   the plurality of storage sections, the third storage section and the control section are supplied with power separately from supply for the control device.

4. A data restoration method performed in a storage system including:
   a plurality of storage devices including a first storage device and a second storage device;
   first and second control devices which restore, based on a first set of data stored in the first storage device, a second set of data stored in the second storage device in a restoration destination storage device which is one of the plurality of storage devices; and
   a disk shelf which houses the plurality of storage devices and the second control device and whose power is supplied separately from supply for the first control device,
   the data restoration method comprising:
   using, by the storage system, the first control device for restoring in order portions of the second set of data and storing progress information indicative of progress of restoration in a third storage device provided in the disk shelf and registering, in the progress information, information indicative of a position in the second storage device corresponding to a portion of the second set of data which is not yet restored; and
   using, by the storage system, the second control device for determining, based on the progress information stored in the third storage device upon detecting that the first control device has stopped, and taking over restoration of the portion of the second set of data which is not yet restored based on the progress information, wherein:
   the using the second control device includes using the second control device for restoring in order the portion of the second set of data which is not yet restored, and updating the progress information stored in the third storage device; and
   the using the first control device includes using the first control device for stopping restoring by the second control device by transmitting an instruction to stop restoration to the second control device and taking over restoration of the portion of the second set of data which is not yet restored based on the progress information from the second control device which is in the middle of restoration at the time of the first control device being started.

* * * * *